United States Patent
Eriksson et al.

(10) Patent No.: US 12,169,067 B2
(45) Date of Patent: Dec. 17, 2024

(54) BURNER FOR USE IN A STREAMING ENGINE

(71) Applicant: Siemens Energy Global GmbH & Co. KG, Bayern (DE)

(72) Inventors: Jonas Eriksson, Finspong (SE); Torsten Jokisch, Neuenhagen bei Berlin (DE); Jens Kleinfeld, Mülheim an der Ruhr (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 412 days.

(21) Appl. No.: 17/614,599

(22) PCT Filed: Apr. 9, 2020

(86) PCT No.: PCT/EP2020/060146
§ 371 (c)(1),
(2) Date: Nov. 29, 2021

(87) PCT Pub. No.: WO2020/244835
PCT Pub. Date: Dec. 10, 2020

(65) Prior Publication Data
US 2022/0228746 A1   Jul. 21, 2022

(30) Foreign Application Priority Data
Jun. 5, 2019 (EP) .................... 19178465

(51) Int. Cl.
*F23R 3/28* (2006.01)
*F02C 7/12* (2006.01)

(52) U.S. Cl.
CPC ............. *F23R 3/283* (2013.01); *F02C 7/12* (2013.01)

(58) Field of Classification Search
CPC .. F23R 3/283; F23R 2900/03045; F02C 7/12; F23D 14/78; F23D 2214/00; F23D 11/38; F23D 11/383; F23D 2900/00016
See application file for complete search history.

(56) References Cited

U.S. PATENT DOCUMENTS

| | | |
|---|---|---|
| 2003/0233832 A1 | 12/2003 | Martling et al. |
| 2004/0040310 A1 | 3/2004 | Prociw et al. |
| 2007/0193272 A1 | 8/2007 | Hebert et al. |
| 2012/0031098 A1 | 2/2012 | Ginessin et al. |
| 2014/0230442 A1 | 8/2014 | Yokota et al. |

(Continued)

FOREIGN PATENT DOCUMENTS

| | | |
|---|---|---|
| CN | 103994468 A | 8/2014 |
| CN | 104373961 A | 2/2015 |

OTHER PUBLICATIONS

PCT International Search Report and Written Opinion of International Searching Authority mailed Jun. 19, 2020 corresponding to PCT International Application No. PCT/EP2020/060146 filed Sep. 4, 2020.

*Primary Examiner* — Ko-Wei Lin
(74) *Attorney, Agent, or Firm* — Wolter Van Dyke Davis, PLLC

(57) ABSTRACT

A burner adapted for use in a streaming engine, wherein the burner provides a combustion channel and a burner tip, wherein the burner tip provides at least one longitudinal cooling fin, and wherein the at least one longitudinal cooling fin provides a longitudinal direction helically circling the combustion channel.

18 Claims, 3 Drawing Sheets

(56) References Cited

U.S. PATENT DOCUMENTS

| | | | |
|---|---|---|---|
| 2015/0047364 A1 | 2/2015 | Gao et al. | |
| 2015/0300634 A1 | 10/2015 | Kiener | |
| 2016/0075587 A1* | 3/2016 | Baker | F23D 14/22 |
| | | | 65/356 |
| 2016/0146468 A1* | 5/2016 | Gao | F23C 7/002 |
| | | | 60/742 |
| 2017/0159491 A1* | 6/2017 | Hoefler | F02C 7/12 |
| 2017/0292795 A1* | 10/2017 | Waissi | F01N 1/023 |
| 2017/0370590 A1* | 12/2017 | Wang | F23D 11/107 |
| 2018/0156044 A1* | 6/2018 | Clark | F23R 3/005 |
| 2018/0214954 A1* | 8/2018 | Haevaker | F23R 3/28 |
| 2019/0078777 A1* | 3/2019 | Keller | F23D 14/24 |
| 2019/0107054 A1* | 4/2019 | Park | F02C 7/18 |
| 2020/0173294 A1* | 6/2020 | Choi | F23R 3/005 |
| 2020/0224876 A1* | 7/2020 | Greenfield | F23R 3/002 |

\* cited by examiner

BURNER FOR USE IN A STREAMING ENGINE

CROSS REFERENCE TO RELATED APPLICATIONS

This application is the US National Stage of International Application No. PCT/EP2020/060146 filed 9 Apr. 2020, and claims the benefit thereof. The International Application claims the benefit of European Application No. EP19178465 filed 5 Jun. 2019. All of the applications are incorporated by reference herein in their entirety.

FIELD OF INVENTION

The present invention refers to an optimized burner to be used in the streaming engine. Furthermore, the present invention refers to a burner tip providing an improved design. Additionally, the present invention refers to the method of manufacturing such burner and/or burner tip. Furthermore, the present invention refers to a streaming engine providing such improved burner. Additionally, the present invention refers to the use of such improved burner.

BACKGROUND OF INVENTION

Burners are essential components of streaming engines like gas turbines. Herein, they play an essential role to provide the fluid stream enabling the streaming engine to convert chemical energy into kinetic energy of the rotor being itself again converted into electrical energy to be distributed. Although, such burners are point of research for longer time they are still subject to developments to further improve their properties. Based on the extreme conditions especially at the burner tip such burners are easily subject to damages resulting from the utilization of said burners and are subject to repair or replacement.

Based on the materials used being highly developed to withstand the harsh conditions as well as highly developed designs adapted to provide maximum efficiency and lowest emission possible such burner provide a significant cost factor for providing or maintaining such streaming engine. Improving the design, prolonging the durability and increasing the reliability are therefore highly interesting targets to be achieved. Therefore, there is the constant need to provide such further improvement for such already highly developed component.

These problems are solved by the products and methods as disclosed hereafter and in the claims. Further beneficial embodiments are disclosed in the dependent claims and the further description. These benefits can be used to adapt the corresponding solution to specific needs or to solve further problems.

SUMMARY OF INVENTION

According to one aspect the present invention refers to a burner adapted to be used in a streaming engine, advantageously a gas turbine, wherein the burner provides a combustion channel and a burner tip, wherein the burner tip provides at least one longitudinal cooling fin, and wherein the at least one longitudinal cooling fin provides a longitudinal direction helically circling the combustion channel. Herein, it is to be understood that such helically circling does not require a complete circling of the combustion channel. Based on the typically very short length of the burner tip even a low angle helical orientation of the longitudinal cooling fin usually results in only a small percentage of the combustion channel being circled by a single cooling fin. The term "helical" as used herein refers to the direction being simultaneously oriented around the combustion channel and in the flow direction of the combustion channel. Surprisingly, it was noted that such cooling fins provide a significantly improved lifetime of the burner tip. It is assumed, that certain deviations of the flow of the gas stream at this position result in some kind of channeling or swirls building up normalizing the heat exchange. This seems to reduce the stress resulting from typical utilizations of the burner on the long term and increasing the lifetime and reliability.

According to further aspect the present invention refers to an inventive burner tip, wherein the burner tip is adapted to be attached to another part to provide the inventive burner. Said burner tip can be manufactured separately to replace a damaged burner tip of an existing burner or to produce the new burner. Herein, providing the burner tip separately allows to easily utilize different manufacturing methods like additive manufacturing, advantageously 3D printing, to provide the inventive cooling fins in a simplified fashion. Thereafter, the burner tip can be attached to the remaining part of the burner that might be manufactured using conventional means.

According to a further aspect the present invention refers to a method of manufacturing an inventive burner, wherein a burner tip providing the at least one cooling fin is manufactured on top of the burner or is manufactured separately to be attached to the burner in a further step. For example, applying the burner tip directly onto the remaining part of the burner typically ensures that a secure connection of burner tip and the rest of the burner is provided. However, building up the burner tip directly upon the remaining part of the burner is a difficult task. On the other hand manufacturing the burner tip separately allows to mass manufacture the burner tips, for example, in an additive manufacturing device, easily store and transport them to the location in need, and, for example, simply attach it to the undamaged part of a burner to be repaired at the location as required. Surprisingly, it was still possible to reliably connect the burner tip and the remaining part of the burner without extensively increasing the postproces sing steps and valuation procedures.

According to a further aspect the present invention refers to a streaming engine, advantageously a gas turbine, containing at least one of the inventive burner. It was noted that such streaming engines provides a higher reliability with regard to their burners and allow to prolong the intervals between the planned maintenance.

According to a further aspect the present invention refers to a use of the inventive burner or the inventive burner tip to provide a streaming engine. Herein, providing such streaming engine includes manufacturing a new streaming engine as well as upgrading an existing streaming engine by implementing the burner or servicing an existing streaming engine by replacing at least one identical used burner. Typically, it is advantageous that at least 50%, more advantageous at least 70%, even more advantageous all, burners in the combustion area of the streaming engine are replaced by the inventive burners during an upgrade. The use of the inventive burners allows to easily improve the properties of an existing steaming engine with low effort.

To simplify understanding of the present invention it is referred to the detailed description hereafter and the figures attached as well as their description. Herein, the figures are to be understood being not limiting the scope of the present invention, but disclosing advantageous embodiments explaining the invention further.

DETAILED DESCRIPTION OF INVENTION

Figure 1:
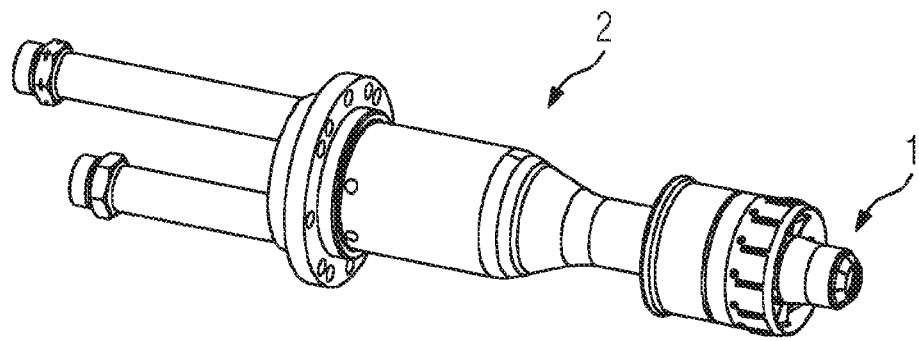
FIG. 1 shows a burner adapted to be used in a gas turbine comprising a burner tip.

According to one aspect the present invention refers to a burner as specified above.

The helical arrangement of the at least one cooling fin results in a multitude of cooling fins provided in a cross-section along the flow direction of the combustion channel. It was noted that it is advantageous that such arrangements are provided in every cross-section along the flow direction of the combustion channel. According to further embodiments it is advantageous that the burner tip provides at least 2, more advantageous at least 3, even more advantageous at least 4, cooling fins in a cross-section along the flow direction of the combustion channel.

In further embodiments it is advantageous that the at least one cooling fin of the burner provides at least 2, more advantageous at least 3, more advantageous at least 5, cooling fins being essentially parallel, more advantageous parallel, to each other within the burner tip. The term "essentially parallel to each other" as used herein refers to an orientation, wherein the corresponding cooling fins essentially keep the same distance to each other. Preferably, the deviation of the distance is less than 10%, more advantageous less than 7%, even more advantageous less than 5%, of the average distance between the corresponding pair of cooling fins.

According to further embodiments it is advantageous that the burner tip provides the at least one cooling fin on the interior of the burner tip. The phrase "interior of the burner tip" as used herein refers to the inner side of the burner tip directed to the combustion channel of the burner. In addition to the aforementioned at least one cooling fin the burner tip can provide further cooling fins located on the outside of the burner tip. Herein, the features as disclosed herein in connection with the at least one cooling fin do not necessarily apply to additional cooling fins located on the outside of the burner tip. Combining the inventive cooling fins on the inside and further cooling fins on the outside providing the inventive design or the conventional design further improves the reliability.

In further embodiments it is advantageous that each cooling fin of the at least one cooling fin and the burner tip circles the combustion channel by at least 10%, more advantageous at least 25%, more advantageous at least 35%. Typically, it is advantageous that each cooling fin of the at least one cooling fin and the burner tip circles the combustion channel by at least 50%, more advantageous at least 60%, more advantageous at least 75%. It was noted that the inventive effect for typical applications increases in case the at least one cooling fin extends around a bigger percentage of the combustion channel.

According to further embodiments it is advantageous that the at least one cooling fin provides an orientation, wherein the orientation results in an average movement of the at least one cooling fin of at least 8 mm, more advantageous at least 10 mm, even more advantageous at least 11 mm, downstream for each circling of the combustion channel. The term "downstream" as used herein refers to the flow direction through the combustion channel. Herein, it has to be understood that the aforementioned at least one cooling fin does not have to extend completely around the combustion channel. In case the at least one cooling fin does not circle the combustion channel once said distance refers to the theoretical distance resulting in case the cooling fin would be prolonged to circle the combustion channel at least once.

In further embodiments it is advantageous that the at least one cooling fin provides an orientation, wherein the orientation results in an average movement of the at least one cooling fin of at most 35 mm, more advantageous at most 33 mm, even more advantageous at most 32 mm, downstream for each circling of the combustion channel.

According to further embodiments it is advantageous that the burner is adapted to provide a flow direction through the combustion channel during usage, wherein the at least one cooling fin provides an angle between the at least one cooling fin and a plane perpendicular to the flow direction being at least 6°, more advantageous at least 7°, even more advantageous at least 8°. It was noted that too small angles of the at least one cooling fin provide less beneficial effects for certain embodiments.

In further embodiments it is advantageous that the burner is adapted to provide a flow direction through the combustion channel during usage, wherein the at least one cooling fin provides an angle between the at least one cooling fin and a plane perpendicular to the flow direction being at most 50°, more advantageous at most 46°, even more advantageous at most 42°. According to further embodiments it is typically especially advantageous that said angle is at most 30°, more advantageous at most 23°, even more advantageous at most 19°. It was noted that too big angles of the at least one cooling fin provide less beneficial effects for certain embodiments.

Typically, it is advantageous that the burner is containing an alloy providing a high temperature resistance like nickel superalloys. For example, the burner can be consisting of a mixture of CMC (ceramic matrix composites) material and high temperature resisting alloy. For typical embodiments it is advantageous that the burner provides at least 90 wt.-%, more advantageous at least 93 wt.-%, even more advantageous at least 95 wt.-%, high temperature resisting alloy, based on the total weight of the burner. For certain embodiments it is especially advantageous that the burner completely consists of high temperature resistant alloy, like a nickel superalloy.

According to further embodiments it is advantageous that the at least one cooling fin provides an angle between the at least one cooling fin and a plane perpendicular to the downstream direction being selected from the range from 6° to 46°, more advantageous from 7° to 30°, even more advantageous from 8° to 23°.

According to further embodiments it is advantageous that the burner tip has been manufactured using additive manufacturing, advantageously 3D printing. Especially the high flexibility provided by additive manufacturing is very beneficial to realize the inventive burner. Herein, 3D printing is especially beneficial for typical embodiments as it allows to realize highly complex shapes with optimized designs with little effort. Utilizing 3D printing processes to manufacture the present burner are surprisingly simple, as the inventive design in addition to the other benefits also provide a simple build up process. Herein, the specific orientation of the cooling fins in combination with typical arrangements of a component to be built provides no major overhang to be printed simplifying the design of such modified structure. This allows to avoid the typically required utilization of support structures significantly decreasing the effort required to realize the inventive cooling fins.

In further embodiments it is advantageous that the burner tip comprises a heat shield providing the at least one cooling fin, wherein the heat shield is detachably connected or inseparably connected to the rest of the burner. Providing such heat shield additionally provides a protection against the significant temperatures developing in front of the burner and typically simplifies the exchange of this especially stressed parts of the burner during repair or service.

According to further embodiments it is advantageous that the at least one cooling fin provides a height of at least 0.4 mm, more advantageous at least 0.6 mm, even more advantageous at least 0.7 mm, measured in a cross-section along the flow direction of the combustion channel. It was noted, that providing a certain minimum height of the cooling fins positively influence the effect achieved with the present invention.

According to further embodiments it is advantageous that the at least one cooling fin provides a height of at most 5 mm, more advantageous at most 4 mm, even more advantageous at most 3 mm, measured in a cross-section along the flow direction of the combustion channel. It was noted, that providing a certain maximum height of the cooling fins renders it easier to provide a possible cooling fin design to be reviewed for its effects while significantly decrease the change that an undesired influence on the flow of a gas stream is observed.

In further embodiments it is advantageous that the at least one cooling fin provides a broadness of at least 0.5 mm, more advantageous at least 0.8 mm, even more advantageous 0.9 mm, measured in a cross-section along the flow direction of the combustion channel. Surprisingly, it was noted that such broadness of the cooling fins increases the reliability of the burner tip for typical applications.

In another aspect the present invention refers to an inventive burner tip as specified above.

According to further embodiments it is advantageous that the burner tip contains a heat shield or is adapted to fasten a heat shield to the burner tip. In case the burner tip is adapted to fasten a heat shield to it, it is advantageous for typical embodiments that the heat shield contains the at least one cooling fin.

In further embodiments it is advantageous that the burner tip consists of a high temperature resistant alloy like nickel superalloy.

In further embodiments it is advantageous that the burner tip is adapted to fasten a heat shield, wherein the fastening mechanism allows to detachably connect the heat shield to the burner tip. Providing such fastening mechanism significantly decreases the required effort to exchange the heat shield during maintenance.

According to another aspect the present invention refers to a method of manufacturing the inventive burner as specified above.

In further embodiments it is advantageous that the burner tip is manufactured using additive manufacturing, advantageously 3D printing. Herein, such burner tip manufactured using additive manufacturing can be directly printed upon the remaining part of the burner. The remaining part of the burner can be directly printed in some AM (additive manufacturing) device like some 3D printing device, or it may be manufactured using conventional means and be introduced into such AM device. Alternatively, the burner tip can be manufactured separately, for example inside an AM device like an 3D printing device in the bigger amount, taken out of the AM manufacturing device and be attached to the remaining part of the burner using for example laser welding. The term "conventional manufacturing methods" as used herein refers to manufacturing methods besides additive manufacturing methods using essentially traditional means like casting. While, for example, a coating might be applied using an additive manufacturing method like laser cladding the essential part of the corresponding component has to be manufactured using such traditional means in such cases. Preferably, at least 90 wt.-%, more advantageous at least 93 wt.-%, even more advantageous at least 99 wt. %, are shaped using traditional means like, for example, casting or grinding.

Herein, the additive manufacturing method can be selected from the additive manufacturing methods, advantageously 3D printing methods, as known in the art. Examples of such methods of additive manufacturing include selective laser melting (SLM), selective laser sintering (SLS), electron beam melting (EBM) and binder jetting. Naturally, other methods of additive manufacturing or specific variants of the methods mentioned before can be employed.

Herein, using a laser based method of additive manufacturing, more advantageous 3D printing, typically provides especially useful results as such methods are well established and allow to process materials with a high temperature resistance like nickel superalloys.

According to another aspect the present invention refers to an inventive streaming engine as described above.

According to another aspect the present invention refers to a use of the inventive burner to provide a streaming engine.

The present invention is only described in further detail for explanatory purposes. However, the invention is not to be understood being limited to these embodiments as they represent embodiments providing benefits to solve specific problems or fulfilling specific needs. The scope of the protection should be understood to be only limited by the claims attached.

FIG. 1 shows a burner 2 adapted to be used in a gas turbine comprising a burner tip 1. Herein, the fuel and air are entering the burner 2 from the left before being mixed in the middle of the burner 2. Said mixture is ignited while exiting the combustion channel to provide the heated fluid to power the streaming engine containing the burner 2.

Not shown in the figure is the at least one cooling fin being a plurality of longitudinal cooling fins located on the inside of the burner tip 1. Herein, the longitudinal cooling fins provide a longitudinal direction helically circling the combustion channel. The plurality of longitudinal cooling fins provides a row of longitudinal cooling fins being located next to each other and being essentially parallel to each other.

The burner 2 as shown in FIG. 1 has been manufactured using 3D printing as a whole. Herein, the longitudinal cooling fins located on the inside of the burner tip 1 have been directly printed to provide the inventive longitudinal direction inside the burner tip 1.

Figure 2:
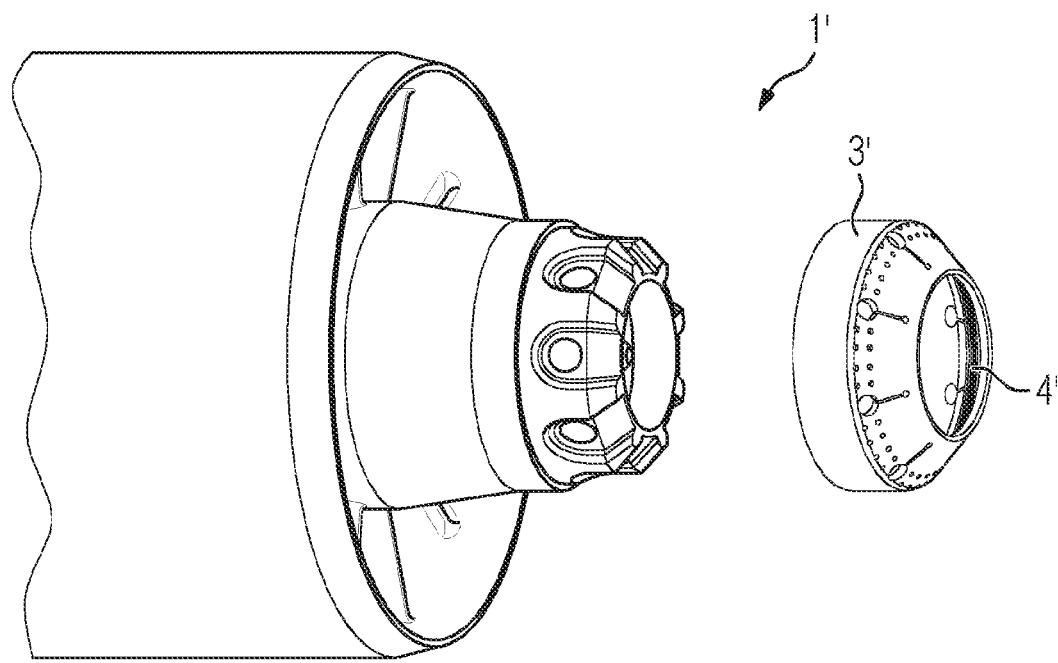
FIG. 2 shows a magnification of the burner tip of conventional design.

FIG. 2 shows a magnification of the burner tip 1' of conventional design. The burner comprising said burner tip 1' is adapted to be used in a gas turbine. Contrary to the inventive burner as shown in FIG. 1 the burner tip 1' does not provide a longitudinal direction helically circling the combustion channel of the longitudinal cooling fins 4' contained in the burner tip P. Instead the longitudinal cooling channels only circle the combustion channel of the burner, resulting in cooling fins 4' being located on a plane perpendicular to the flow direction of the combustion channel. Furthermore, the longitudinal cooling fins 4' are located on the inside of a heat shield 3' the is detachably connected to provide the burner tip 1' of the burner.

The heat shield 3' in the comparative example as shown in FIG. 2 has been manufactured using conventional means including casting and milling.

Figure 3:
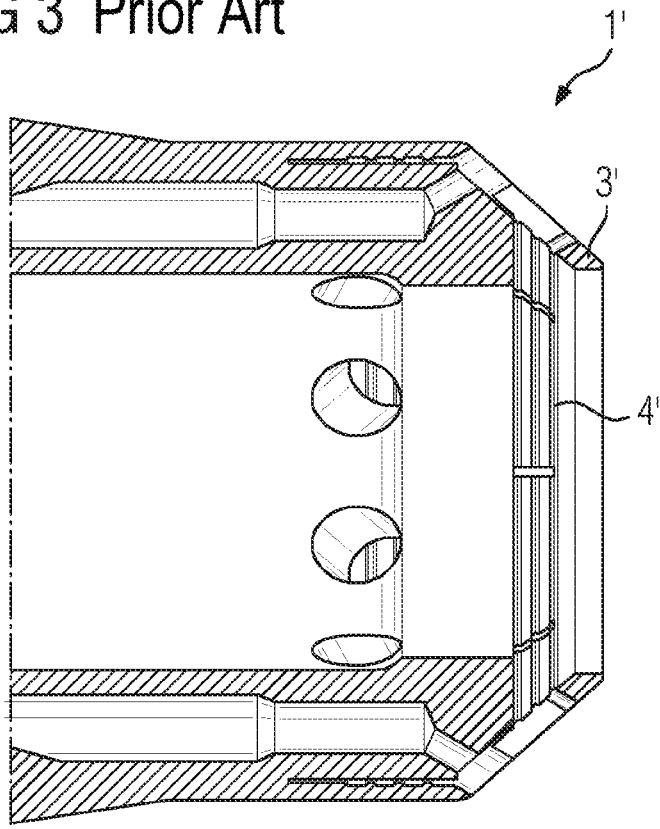
FIG. 3 shows a magnified cutout of a cross-section along the flow direction of the combustion channel showing the burner tip of the conventional design as shown in FIG. 2.

FIG. 3 shows a magnified cutout of a cross-section along the flow direction of the combustion channel showing the burner tip 1' of the comparative design as shown in FIG. 2. Herein, the cutout along the flow direction of the combustion channel clearly shows the arrangement of the cooling fins 4' in a plane perpendicular to the flow direction of the combustion channel.

Figure 4:
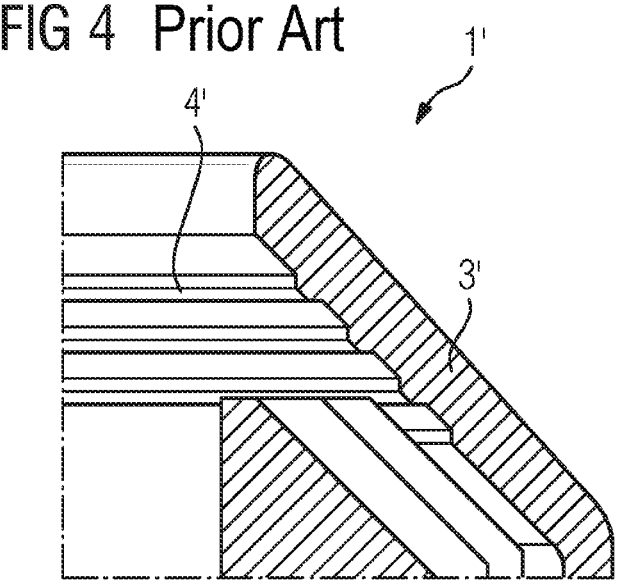
FIG. 4 shows a further magnified cutout of a cross-section of FIG. 2.

FIG. 4 shows a further magnified cutout of the cross-section of FIG. 2. Herein, the cooling fins 4' are clearly visible on the inner side of the burner tip 1'.

Figure 5:
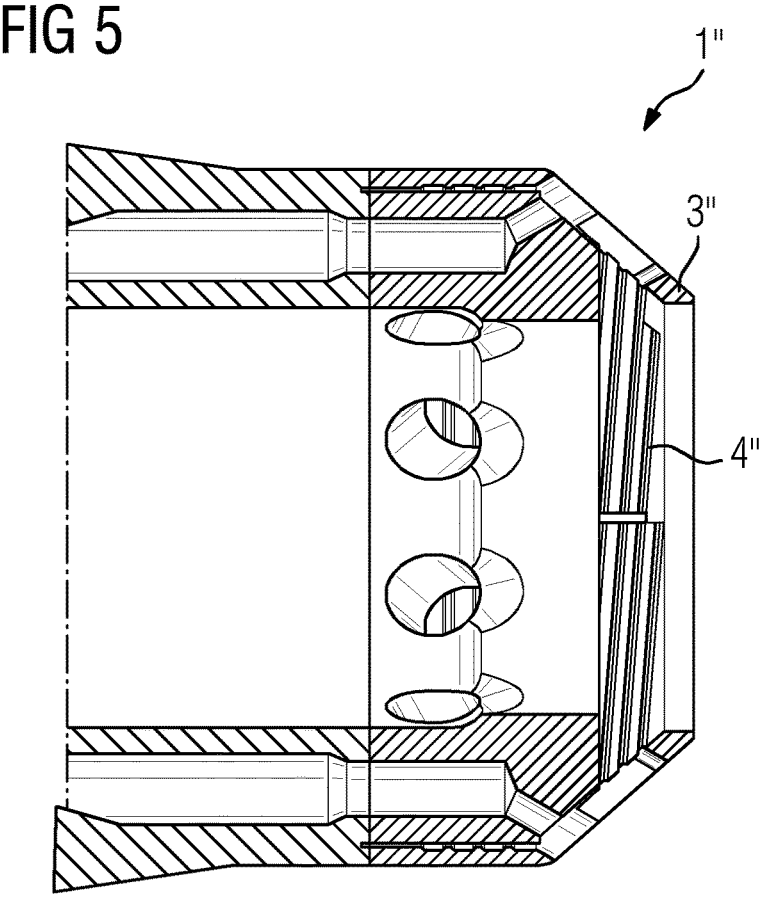
FIG. 5 shows a magnified cross-section along the flow direction of the combustion channel of a burner tip of the inventive design.

FIG. 5 shows a magnified cross-section along the flow direction of the combustion channel of a burner tip 1" of an inventive design. Comparable to the design as shown in FIG. 1 the burner being adapted to be used in a streaming engine provides a combustion channel and a burner tip 1". The burner tip 1" provides a multitude of longitudinal cooling fins 4" being arranged essentially parallel to each other on the inside of the burner tip 1". Herein, the longitudinal cooling fins 4" provide a longitudinal direction helically circling the combustion channel.

The burner tip 1" providing the longitudinal cooling fins 4" comprises a heat shield 3" containing said longitudinal cooling fins 4". Comparable to the example as shown in FIGS. 2 to 4 the heat shield 3" is detachably connected to the rest of the burner. Herein, the heat shield 3" has been manufactured by 3D printing, wherein the cooling fins 4" have been directly printed along with the rest of the heat shield 3".

Figure 6:
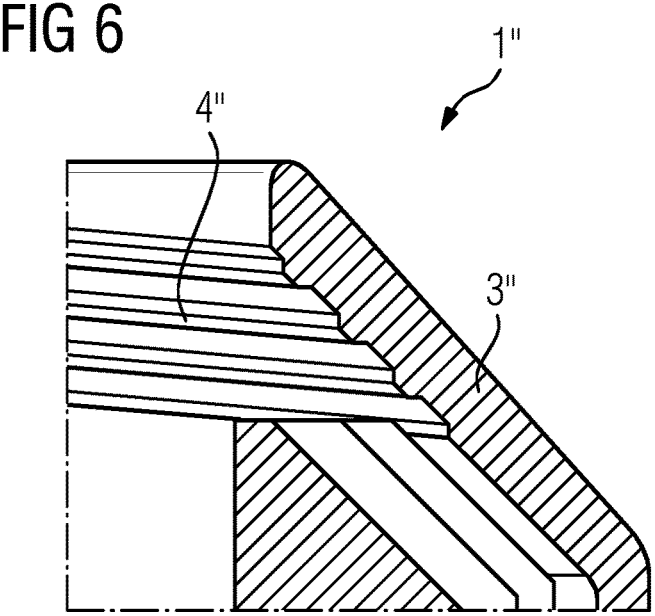
FIG. 6 shows a further magnified cutout of a cross-section of FIG. 5.

FIG. 6 shows a further magnified cutout of a cross-section showing the burner tip 1" of the inventive design as shown in FIG. 5. Herein, the cooling fins 4" are clearly visible on the inner sides of the burner tip 1".

The invention claimed is:

1. A burner adapted to be used in a streaming engine, comprising:
   a combustion channel and a burner tip,
   wherein the burner tip comprises at least one longitudinal cooling fin,
   wherein the at least one longitudinal cooling fin helically circles the combustion channel along a longitudinal direction,
   wherein the burner is adapted to provide a flow direction through the combustion channel,
   wherein an angle between the at least one cooling fin and a plane perpendicular to the flow direction is at most 50°,
   wherein the angle between the at least one cooling fin and the plane perpendicular to the flow direction is at least 6°,
   wherein the burner tip comprises a heat shield providing the at least one cooling fin, wherein the heat shield is detachably connected or inseparably connected to a remainder of the burner, and
   wherein the heat shield comprises a central opening and a plurality of openings that are disposed in an annular array around the central opening and that pass from a radially inner side of the heat shield to a radially outer side of the heat shield.

2. The burner according to claim 1,
   wherein each cooling fin of the at least one cooling fin spans at least 10% of a circumference of burner tip.

3. The burner according to claim 1,
   wherein the at least one cooling fin provides a height of at least 0.4 mm, measured in a cross-section along the flow direction of the combustion channel.

4. The burner according to claim 1,
   wherein the at least one cooling fin provides at least 2 cooling fins being essentially parallel to each other within the burner tip.

5. The burner according to claim 1,
   wherein the burner tip provides the at least one cooling fin on the interior of the burner tip.

6. The burner according to claim 1,
   wherein the burner tip is manufactured using additive manufacturing.

7. The burner according to claim 1,
   wherein the at least one cooling fin provides a broadness of at least 0.5 mm, measured in a cross-section along the flow direction of the combustion channel.

8. The burner according to claim 1,
   wherein the burner tip is adapted to be attached to another part.

9. A method of manufacturing a burner according to claim 1, the method comprising:
   manufacturing the burner tip providing the at least one cooling fin on top of the burner or manufacturing the burner tip separately to be attached to the burner in a further step.

10. The method according to claim 9,
    wherein the burner tip is manufactured using additive manufacturing.

11. A streaming engine, comprising:
    at least one burner according to claim 1.

12. The burner according to claim 1,
    wherein the streaming engine comprises a gas turbine.

13. The burner according to claim 1,
    wherein the heat shield is detachably connected to the remainder of the burner.

14. The burner according to claim 1,
    wherein the heat shield defines an annular gap that is between the heat shield and the remainder of the burner and that is concentric with and surrounds the combustion channel,
    wherein a portion of the heat shield extends in the longitudinal direction past a downstream-most end surface of the remainder of the burner,
    wherein the at least one cooling fin is disposed in the portion of the heat shield that extends past the downstream-most end surface of the remainder of the burner, and
    wherein the downstream-most end surface is disposed between the annular gap and the at least one cooling fin.

15. The burner according to claim 1,
    wherein the heat shield comprises a concave portion that receives therein the remainder of the burner.

16. The burner according to claim 15,
wherein the concave portion is set apart from a portion of the remainder of the burner by a gap.

17. The burner according to claim 1, further comprising:
an annular array of openings, wherein each opening originates at a combustion channel surface that defines a radially outer boundary of the combustion channel, leads radially outward through the remainder of the burner, and opens into a space between the remainder of the burner and the heat shield.

18. The burner according to claim 17,
wherein each space leads to the at least one longitudinal cooling fin.

* * * * *